United States Patent Office 3,071,508
Patented Jan. 1, 1963

3,071,508
COMPOSITIONS FOR ORAL ADMINISTRATION IN UNIT DOSAGE FORM FOR PROPHYLAXIS AND TREATMENT OF POISON IVY AND POISON SUMAC DERMATITIS
Margaret B. Strauss, 334 E. 25th St., New York, N.Y.
No Drawing. Filed June 26, 1958, Ser. No. 744,644
2 Claims. (Cl. 167—55)

This invention relates generally to compositions of matter useful in prophylaxis and treatment of contact dermatitis produced by plants of the genus Rhus and, more particularly, it is concerned with novel compositions useful in propylaxis and treatment of dermatitis venenata produced by contact with poison ivy or poison oak plant parts.

It has long been known that certain dermatitis-producing plants, notably those of the genus Rhus, can provide sources of principles in the form of oils or resins and that these oils or resins may be used in preparation of medicament that may be employed in the diagnosis, mitigation and treatment of contact dermatitis produced by those plants.

Prior to the present invention, the only truly effective method for prophylaxis or treatment of dermatitis produced by plants of the genus Rhus, based on physiologically active materials derived from such plants, consisted in parenteral administration of liquid preparations containing said active materials. Initially, these liquid preparations consisted of alcohol or oleaginous extracts of the active materials present in the plants. It was found to be essential that the alcoholic extracts be water-free as even small amounts of water cause rapid composition of active material in the extract.

It will be obvious that parenteral administration of an alcoholic extract or of an oleaginous extract necessarily would be painful to the person receiving it, and a need then was felt, therefore, for a preparation that could be parenterally administered without producing pain or discomfort, while possessing full physiological activity and therapeutic efficacy. Such preparations and processes for making the same are the subject matter of United States Patent 2,456,750 issued December 21, 1948 to the present inventor. This patent teaches, inter alia, that plant parts of the genus Rhus may be extracted with pyridine, the separated extract may be treated with alum to cause formation of an oleo-resin pyridine alum complex, and that this oleo-resin pyridine alum complex may be suspended in aqueous saline solution for parenteral administration. The suspension is found to have full physiological activity which may be readily standardized and this activity is retained indefinitely under ordinary storage conditions. The suspension may be administered parenterally without producing pain or discomfort.

Although these prior art extracts of the physiologically active resins and the aqueous saline suspensions of the oleo-resin pyridine alum complex are effective agents for prophylaxis and treatment of contact dermatitis produced by plants of the genus Rhus, it will be recognized that they have in common the disadvantage that they must be parenterally administered, either subcutaneously or intramuscularly, and this administration requires medical techniques usually beyond the skill of the average person, thereby limiting use of these products to instances where medically skilled personnel are available to administer them.

A real need now has been felt, therefore, for a product effective in prophylaxis and treatment of contact dermatitis produced by plants of the genus Rhus which would be suitable for more convenient methods of administration, preferably oral administration, under field or other conditions where skilled medical personnel might not be available to administer the product by parenteral routes.

In the past various unsuccessful attempts have been made to provide a product of this type. For example, it has been suggested that alcoholic solutions or extracts of the physiologically active oleo-resin from plants of the genus Rhus be orally ingested. This procedure has the disadvantage that these active extracts produce lesions upon contact with the hands, lips and mouth, and, additionally, toxic side effects are observed, including pruritus ani, gastric upset and vesicular dermatitis, thus this procedure, for obvious reasons has not met with general acceptance.

It was found, further, that only absolute, i.e., water-free, alcoholic extracts of the physiologically active resin were stable and that small amounts of water caused rapid deterioration of the physiological activity, thus the oral tinctures were found to lose their activity rendering them unsuitable for use.

It has also been suggested that a vegetable oil extract of the physiologically active oleo-resin might be orally administered but it was found that this type of extract was subject to the same disadvantages attendant upon administration of the alcoholic extracts. It has been proposed to treat poison ivy sensitive individuals by oral administration of encapsulated vegetable oil extracts of physiologically active poison ivy oleo-resin but it was found that about eighty percent of the individuals so treated developed toxic reactions including erythemas of the extremities, pruritis, and vesicular dermatitis or papular rashes.

An object of this invention is to provide a non-toxic product that can be orally administered in accordance with a prescribed schedule to provide therapeutically effective prophylaxis and treatment of contact dermatitis produced by plants of the genus Rhus.

Another object of this invention is to provide an orally administrable therapeutically effective product of the type aforesaid that may be administered without causing local irritation of the hands, skin or mouth, and without producing any of the toxic side effects aforementioned.

Other objects of the invention will be apparent hereinafter.

Regarded in certain of its broader aspects, the novel compositions of matter according to this invention comprise orally administrable unit dosage forms of a product comprising a dry solid oleo-resin pyridine alum complex, produced by pyridine extraction of plant parts of the genus Rhus followed by alum precipitation and drying, in combination with a dry solid pharmaceutical carrier. More particularly, this invention comprises products of the aforesaid type wherein the dry solid oleo-resin pyridine alum complex is present in a minimum amount of about 0.6 milligram per unit dosage form.

The subject matter of the aforementioned patent of the present inventor, No. 2,456,750 is a process for producing parenterally administrable isotonic saline suspensions of a complex product obtained by extracting plant parts of the genus Rhus with pyridine, followed by precipitation with alum and suspension of the precipitate in isotonic saline solution. There is no suggestion in this patent of any recovery of the precipitate as a dry solid nor is there any suggestion that it would be suitable for use in other than isotonic saline suspension.

It is indeed a most remarkable discovery in accordance with this invention that when this complex material is isolated in dry solid state and mixed with a pharmaceutical carrier, it is therapeutically effective upon oral administration in the prophylaxis and treatment of dermatitis produced by plants of the genus Rhus. When the saline suspension of the physiologically active product is administered parenterally, there is no local irritation, indicating that the oleo-resin pyridine alum complex is not immediately decomposed in the tissue to yield the toxic, irritating oleo-resin as such, but instead merely slowly decomposes to allow the oleo-resin to effect the desired therapeutic result. The fact that the oleo-resin pyridine alum complex administered parenterally eventually is decomposed by tissue fluids under the mild conditions of tissue environment would at least suggest that this complex material would be unsuitable for oral administration because it would be destroyed immediately by the strong acids and bile salts encountered in the digestive track thereby causing the undesirable toxic side effects produced by oral administration of the oleo-resin extracts aforementioned. In particular, it would not be expected that upon oral administrations the complex would survive as such and be capable of absorption as such through the intestine wall into the blood stream; instead, it would be expected that the oleo-resin pyridine alum complex would decompose to produce the oleo-resin in such concentrations within the organs as to cause at least irritation if not severe damage, particularly to the kidneys.

In accordance with this invention it now is found, remarkably, that when the isolated oleo-resin pyridine alum complex is mixed with a pharmaceutical carrier, the mixture may be orally administered and the complex in this mixture is not decomposed by its environment in the digestive system, being instead absorbed through the intestine wall into the blood stream in sufficient quantities to maintain the necessary blood levels and produce the desired therapeutic responses. It is remarkable, further, that oral administration of the products of this invention result in a substantially complete absorption of the products while in the digestive system without detectable irritation or damage to the organs thereof, particularly the kidneys, as demonstrated by gross and microscopic pathology of these tissues following a sustained period of such oral administration.

These novel compositions in accordance with the present invention preferably are prepared substantially as follows: Plant parts of the genus Rhus, preferably dried freshly harvested leaves are ground and added to about ten times their weight of pyridine, the mixture being allowed to stand over night at room temperature, after which the solution is filtered. The solution is characteristically deep green in color and contains the pyridine complex of the physiologically active oleo-resin present in the leaves. An approximately equal volume of dilute sulfuric acid containing about two percent of potassium alum is slowly added to the pyridine solution with continuous agitation. A voluminous finely divided deep green precipitate which is formed in the mixture is recovered by filtration, washed on the filter with an aqueous saline solution containing a small amount of phenol, then it is resuspended in a minimum quantity of aqueous saline solution to produce a suspension containing thirty milligrams dry weight of oleo-resin pyridine alum complex per cubic centimeter. This suspension then is mixed with a large volume of a substantially inert water-insoluble pharmaceutical carrier such as infusorial earth, talc, terra alba base or the like, and the mixture is dried at about 50° C. The product then is ground to a degree of fineness for tableting operations, mixed with suitable lubricants and tableting agents such as corn starch, talc or calcium stearate, inter alia, and tableted to yield tablets containing a minimum of about 0.6 milligram of the solid complex per tablet.

Effective prophylatic treatment of dermatitis produced by contact with the plants of the genus Rhus is effected by oral administration of these tablets on substantially the following dosage schedule: one tablet is administered on alternate days for a two week period, then one tablet is administered daily for the following two week period, and, thereafter, two tablets are administered daily until a total of two hundred tablets has been administered.

It will be noticed that the inert pharmaceutical carrier utilized in the products of this invention is a water-insoluble substance. This qualification is of great importance because water-soluble materials that sometimes are used as pharmaceutical carriers, such as lactose, yield products which are unsuitable for use, possibly because a further complex is formed between these water-soluble materials and the oleo-resin pyridine alum complex. Under these circumstances absorption of the complex through the intestine wall fails to take place and thus such products lack therapeutic efficacy.

The following clinical experiences illustrate the effectiveness of the products of this invention for use in prophylactic treatment of dermatitis produced by one of the members of the genus Rhus, common poison ivy. A group of sixteen individuals who had a past history of poison ivy dermatitis and who, upon patch testing, were found to be sensitive to poison ivy was utilized in the study. Analysis indicated each of the subjects initially to have a normal urine condition. Ingestion of the physiologically active tablets upon the dosage schedule aforementioned was completed and then it was found that all of the test subjects showed a marked decrease in sensitivity to poison ivy, as measured by the patch test; and eight of the sixteen subjects showed a complete loss of sensitivity to poiston ivy as measured by the most rigorous standards available. Of the remaining eight subjects, those that had shown initially a severely positive or moderately positive sensitivity in the patch testing were found to be mildly or fairitly positive after the tablet ingestion. Each of the subjects then was exposed to contact with dried poison ivy leaves and it was found that only in one case was any dermatitis observed and that was merely a minimal mild and very limited rash which disappeared after two days without requiring any further therapy. Urine analysis of the subjects after completion of the tablet ingestion revealed the urine of all subjects to be substantially normal and without difference between the pre-treatment and post-treatment analysis. Although these subjects were extremely observant medical students, none reported any severe irreversible side effects during ingestion of the tablets and no subject had a side reaction causing cessation of tablet ingestion. In summary, these subjects, excepting merely one, developed complete clinical immunity to poison ivy as a result of the tablet ingestion and the one that did not develop clinical immunity was found thereafter to be but mildly sensitive.

In another clinical investigation of the poison ivy products according to this invention, the subjects selected were a group of workers intimately and continually exposed to contact with poison ivy, being charged with responsibility for clearing vegetable overgrowth along the shores of the Mississippi River and its tributaries. One hundred twelve subjects constituted the group investigated, of whom forty-one individuals had a past history of poison ivy dermatitis and the remainder had no such past history. Following administration of the tablets at substantially the dose levels aforesaid it was found that within the first six weeks merely three individual developed mild poison ivy dermatitis and one individual developed moderately severe dermatitis, and after tthe initial six week period merely four individuals developed mild poison ivy dermatitis and merely two individuals developed moderately serious dermatitis. These data indicate that within the initial six week period of tablet ingestion eighty-eight percent of the "sensitive" individuals achieved good protection [had merely mild poision ivy dermatits] and, after the six week period of tablet ingestion, ninety-nine percent of the group were afforded good protection. No individual developed serious dermatitis and no noticeable side effects were observed.

Toxicity investigations in vivo were conducted upon products of this invention as follows: twelve guinea pigs were used as subjects, four being used as controls and the remaining eight being administered tableted poison ivy pyridine alum complex in combination with a substantially inert essentially water-insoluble pharmaceutical carrier at a dosage level providing 2.4 milligrams of the complex daily. On a weight basis this is about six hundred times the recommended daily dosage level for humans. Administration of the tablets was continued for a period of sixteen days and the animals remained healthy in appearance, gaining weight and retaining sleek glossy coats of hair.

At the end of this period the animals were patch tested by removing hair from selected areas and applying patches containing 1:20 and 1:50 concentrates of pyridine ivy extract in absolute ethanol. Previous studies indicated sensitized guinea pigs will react to patches of 0.2 milliliter of these extracts at these concentrations. The patch tests after twenty-four and forty-eight hours were found to be negative on all animals tested, indicating that even an overwhelming dosage of the products of this invention, administered per os to the guinea pig, failed to cause sensization. After three weeks, the animals were sacrificed and examined both grossly and microscopically. All organs, including the kidneys, liver and stomach, were grossly normal and microscopic examination of the kidneys showed no differences between the control animals and the animals that ingested the tables. These data and the clincal experiences above described clearly indicate the lack of toxicity of the products of this invention.

To facilitate a fuller and more complete understanding of the subject matter of this invention, certain specific examples herewith follow but it is to be understood clearly that these examples are provided by way of illustration merely and are not to be regarded as imposing limitations upon the scope of the subjoined claims.

*Example 1*

About 400 grams of dried freshly harvested poison ivy leaves are added to four liters of pyridine and the mixture is allowed to stand overnight at room temperature, after which it is filtered and to the filtrate is added an equal volume of a two percent potassium alum solution in 0.25 normal sulphuric acid. It is found that a voluminous precipitate forms in the mixture. Nine liters of water is added and the mixture is filtered, then the residue is washed three times with aqueous saline solution containing about 0.4 percent phenol. The residue is resuspended in about 1,825 cubic centimeters of the phenol-containing aqueous saline solution and mixed with about twenty-two pounds of terra alba base, then the mixture is dried at about 105° F. and ground to a degree of fineness such as to pass a 2A screen. Somewhat less than four pounds total of corn starch, talc and calcium stearate are added and the mixture is further ground to assure homogeneity. This material then is tableted to produce four grain tablets containing 0.6 milligram dry weight of the poison ivy pyridine alum complex per tablet.

These tablets, when orally administered, are effective in prophylaxis and treatment of contact dermatitis produced by poison ivy plants.

*Example 2*

The procedure described in Example 1 is repeated except that an equal weight of dried freshly harvested poison oak leaves is substituted for the poison ivy leaves. The product so obtained, upon oral administration, is effective in prophylaxis and treatment of contact dermatitis produced by poison oak plants.

*Example 3*

The procedure described in Example 1 is repeated except that an equal weight of dried freshly harvested poison sumac leaves is substituted for the poison ivy leaves. The product so obtained, upon oral administration, is effective in prophylaxis and treatment of contact dermatitis produced by poison sumac plants.

It will be understood by those skilled in the chemical and pharmaceutical arts that various other pharmaceutical carriers, provided that they are essentially water-insoluble, can be used in making the products of this invention. It also will be evident that the proportions of components, apart from the concentration of the oleo-resin pyridine alum complex, can be varied without departing from the spirit and substance of this invention.

By the term dry solid oleo-resin pyridine alum complex as herein employed is meant a product such as may be obtained pursuant to the process of United States Patent 2,455,750, i.e. a product obtained by pyridine extraction of masticated ground or shredded parts of plants of the genus Rhus followed by precipitation of a solid from said extract by addition of aqueous alum solution, separation of said solid from the extract, washing the solid with water or isotonic saline solution, then drying the same. It will be understood that the term "dry solid oleo-resin pyridine alum complex" as used in the following claims is used in this limited significance.

Having thus described the subject matter of this invention what is desired to secure by Letters Patent of the United States is:

1. A composition of matter for oral administration in unit dosage solid form for prophylaxis and treatment of contact dermatitis caused by poison ivy and poison sumac comprising a major proportion of substantially inert essentially water-insoluble solid pharmaceutical carrier selected from the group consisting of infusorial earth, terra alba and talc and, as the active ingredient, a dry solid oleo-resin pyrdine alum complex obtained by pyridine extraction of shredded poison ivy and poison sumac plants followed by precipitation of a solid from said extract by addition of aqueous alum solution, separation of said solid, washing and drying to obtain said complex, said complex being present in an amount of about 0.6 milligram per unit dosage.

2. A method for prophylaxis and treatment of contact dermatitis caused by poison ivy and poison sumac comprising administering orally the composition of claim 1 in a dosage of 4 grains–8 grains daily for a total of about 200 dosages over a period of three months.

References Cited in the file of this patent

UNITED STATES PATENTS 2,456,750  Strauss _____ Dec. 21, 1948

OTHER REFERENCES

New and Nonofficial Remedies, 1947, Lippincott Co., Phila., Pa., pages 15–17.

Passenger: J. Allergy, vol. 27, No. 5, September 1956, pages 409–412.

Novacovich: Compounders Corner, Drug and Cosmetic Industry, August 1946.